US010511893B2

(12) United States Patent
Ramakrishnan et al.

(10) Patent No.: US 10,511,893 B2
(45) Date of Patent: Dec. 17, 2019

(54) SYSTEM AND METHOD FOR CONTENT VALIDATION

(71) Applicant: AT&T INTELLECTUAL PROPERTY I, L.P., Atlanta, GA (US)

(72) Inventors: Kadangode K. Ramakrishnan, Berkeley Heights, NJ (US); Vijay Gopalakrishnan, Edison, NJ (US); Fang Yu, Columbus, OH (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 252 days.

(21) Appl. No.: 15/460,689

(22) Filed: Mar. 16, 2017

(65) Prior Publication Data

US 2017/0188111 A1    Jun. 29, 2017

Related U.S. Application Data

(63) Continuation of application No. 14/463,346, filed on Aug. 19, 2014, which is a continuation of application No. 13/333,514, filed on Dec. 21, 2011, now Pat. No. 8,812,587, which is a continuation of application No. 12/332,008, filed on Dec. 10, 2008, now Pat. No. 8,108,544.

(51) Int. Cl.
| | | |
|---|---|---|
| *G06F 15/16* | (2006.01) |
| *H04N 21/63* | (2011.01) |
| *H04L 29/06* | (2006.01) |
| *H04N 7/173* | (2011.01) |
| *H04N 21/262* | (2011.01) |
| *H04N 21/8352* | (2011.01) |
| *H04N 21/845* | (2011.01) |
| *H04N 21/472* | (2011.01) |
| *H04N 21/643* | (2011.01) |

(52) U.S. Cl.
CPC .......... *H04N 21/632* (2013.01); *H04L 29/06* (2013.01); *H04N 7/17318* (2013.01); *H04N 21/26258* (2013.01); *H04N 21/47202* (2013.01); *H04N 21/64322* (2013.01); *H04N 21/8352* (2013.01); *H04N 21/8456* (2013.01); *H04L 65/4084* (2013.01)

(58) Field of Classification Search
CPC .................................................. H04N 21/632
USPC ........................................................ 709/232
See application file for complete search history.

(56) References Cited

U.S. PATENT DOCUMENTS

| | | | | |
|---|---|---|---|---|
| 5,922,051 A * | 7/1999 | Sidey | ................. | H04L 41/0213 709/223 |
| 5,953,691 A | 9/1999 | Mills | | |
| 6,461,245 B1 | 10/2002 | Morgan | | |
| 6,480,977 B1 * | 11/2002 | Apisdorf | ............ | H04Q 11/0478 370/241 |

(Continued)

*Primary Examiner* — Anthony Mejia
(74) *Attorney, Agent, or Firm* — Akerman LLP; Michael K. Dixon; Mammen (Roy) P. Zachariah, Jr.

(57) ABSTRACT

A method includes receiving at a directory server a notification from a client system, where the notification indicates that the first client received a corrupt packet of a playfile from a first peer. The method also includes determining if the first peer is a poor quality peer, updating a first peer score for the first peer if the first peer is not a poor quality peer, identifying a second peer that is not on a blacklist, and providing a peer identification associated with the second peer to the client system.

20 Claims, 11 Drawing Sheets

(56) References Cited

U.S. PATENT DOCUMENTS

| | | | |
|---|---|---|---|
| 6,650,624 B1 * | 11/2003 | Quigley | H04J 3/1694 370/252 |
| 6,757,517 B2 | 6/2004 | Chang | |
| 7,236,739 B2 | 6/2007 | Chang | |
| 7,266,645 B2 | 9/2007 | Garg et al. | |
| 7,296,288 B1 | 11/2007 | Hill et al. | |
| 7,591,022 B2 | 9/2009 | Carpentier et al. | |
| 7,668,160 B2 | 2/2010 | Narayan et al. | |
| 7,792,121 B2 | 9/2010 | Thompson, III et al. | |
| 7,834,784 B1 | 11/2010 | Zhang et al. | |
| 7,870,409 B2 | 1/2011 | Murase | |
| 8,095,803 B1 | 1/2012 | Carter et al. | |
| 8,103,870 B2 * | 1/2012 | Clower | H04L 61/1582 709/218 |
| 8,108,330 B2 * | 1/2012 | Li | G06Q 10/06 706/45 |
| 8,195,522 B1 * | 6/2012 | Sonne | G06Q 30/06 705/26.2 |
| 9,084,025 B1 * | 7/2015 | Gossweiler, III | G06F 16/489 |
| 10,097,441 B2 * | 10/2018 | Lee | G06Q 30/0201 |
| 2002/0168938 A1 | 5/2002 | Chang | |
| 2002/0097427 A1 | 7/2002 | Kazama et al. | |
| 2002/0065912 A1 | 11/2002 | Catchpole et al. | |
| 2003/0014134 A1 | 1/2003 | Morgan | |
| 2003/0033233 A1 | 2/2003 | Lingwood et al. | |
| 2003/0084298 A1 | 5/2003 | Messerges et al. | |
| 2003/0115485 A1 | 6/2003 | Milliken | |
| 2004/0028000 A1 * | 2/2004 | Billhartz | H04L 1/00 370/312 |
| 2004/0190526 A1 | 9/2004 | Kumar et al. | |
| 2004/0248601 A1 | 12/2004 | Chang | |
| 2005/0044417 A1 | 2/2005 | Carpentier et al. | |
| 2005/0191997 A1 * | 9/2005 | Spearman | H04L 51/12 455/418 |
| 2005/0203851 A1 * | 9/2005 | King | H04L 63/10 705/51 |
| 2005/0256952 A1 | 11/2005 | Mouhanna et al. | |
| 2006/0031150 A1 | 2/2006 | Senturk et al. | |
| 2006/0059063 A1 | 3/2006 | LaComb et al. | |
| 2006/0136728 A1 | 6/2006 | Gentry et al. | |
| 2007/0036175 A1 | 2/2007 | Zimmermann et al. | |
| 2007/0136476 A1 | 6/2007 | Rubinstein | |
| 2007/0189154 A1 * | 8/2007 | Hourtane | H04L 12/42 370/218 |
| 2007/0230372 A1 | 10/2007 | He et al. | |
| 2008/0005120 A1 * | 1/2008 | Li | H04L 67/104 |
| 2008/0016201 A1 * | 1/2008 | Thompson | H04L 47/10 709/223 |
| 2008/0086574 A1 | 4/2008 | Raciborski et al. | |
| 2009/0012957 A1 | 1/2009 | Villaret et al. | |
| 2009/0043900 A1 | 2/2009 | Barber | |
| 2009/0067324 A1 * | 3/2009 | Licardie | H04L 12/40182 370/225 |
| 2009/0097413 A1 * | 4/2009 | Todd | H04L 29/06027 370/253 |
| 2009/0190492 A1 * | 7/2009 | Khayam | H04L 1/0072 370/252 |
| 2010/0106798 A1 | 4/2010 | Baretto et al. | |

* cited by examiner

SYSTEM AND METHOD FOR CONTENT VALIDATION

CROSS REFERENCE TO RELATED APPLICATIONS

This application is a continuation of U.S. patent application Ser. No. 14/463,346, filed on Aug. 19, 2014, which is a continuation of U.S. patent application Ser. No. 13/333,514, filed on Dec. 21, 2011, now U.S. Pat. No. 8,812,587, which is a continuation of U.S. patent application Ser. No. 12/332,008, filed on Dec. 10, 2008, now U.S. Pat. No. 8,108,544, the disclosures of which are hereby incorporated by reference in their entireties.

FIELD OF THE DISCLOSURE

The present disclosure generally relates to Internet Protocol Television (IPTV) networks, and more particularly relates to a system and method for content validation.

BACKGROUND

Video-on-demand (VOD) service allows a television viewer to see a program at a time of their choosing. This stands in contrast to traditional broadcast television service that requires a viewer to select from a list of programs that are shown at a predetermined time. Such time-shifting is one advantage that VOD service offers viewers over traditional television service.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
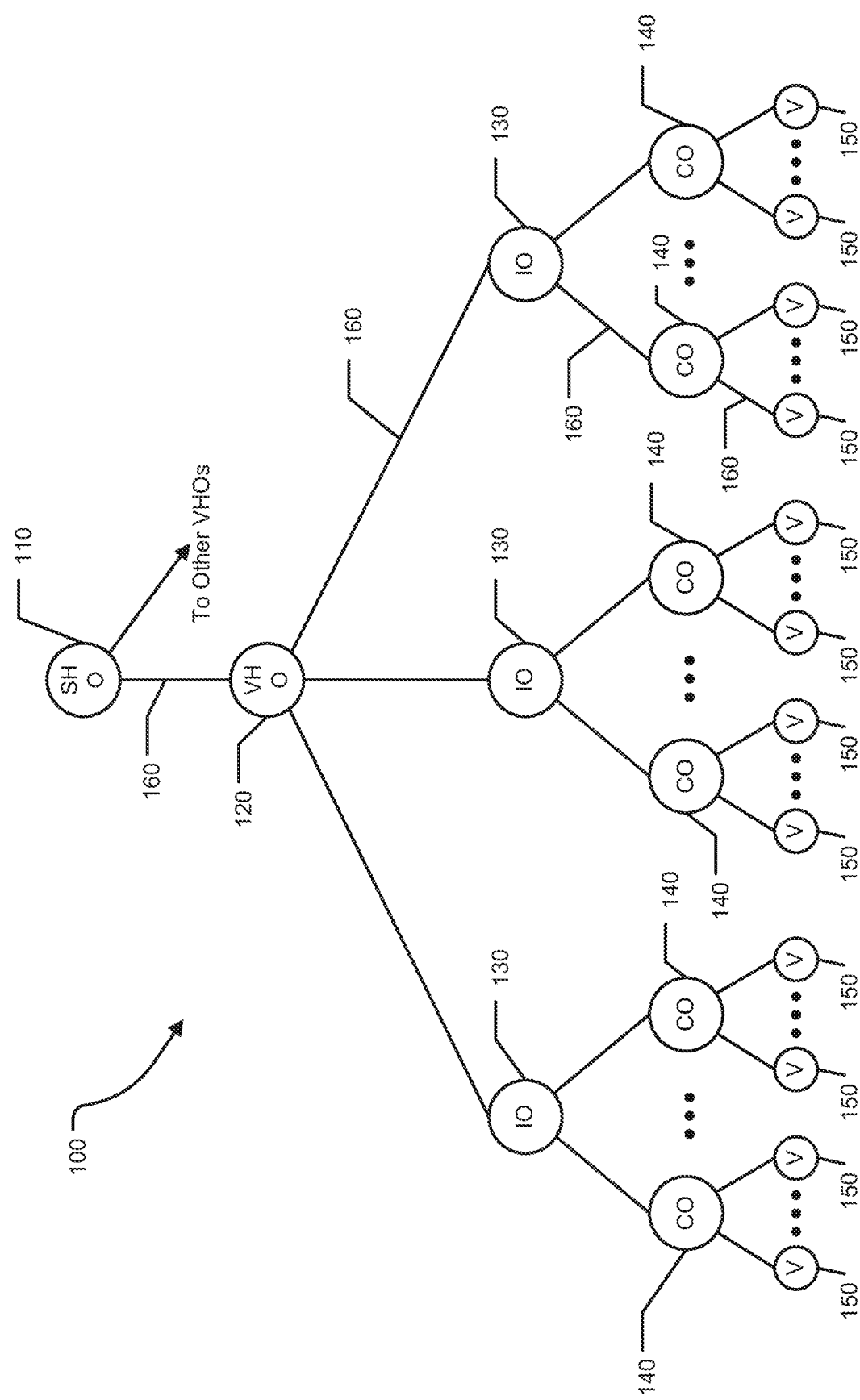
FIGS. 1, 2, and 3 are block diagrams illustrating an embodiment of an Internet Protocol Television (IPTV) network.

FIG. 1 shows one example embodiment of a television distribution system or network 100, using IPTV technology in this example but not limited thereto, adapted to provide, among other things, the VOD features of the disclosed subject matter. The network 100 may include a super hub office (SHO) 110 for acquisition and encoding of video content, one or more video hub offices (VHO) 120 in each demographic market area (DMA), one or more intermediate offices (IO) 130, one or more central offices (CO) 140 located in each metropolitan area, and customer premises equipment (CPE) 150 that may be located in single or multiple dwelling units. In one example embodiment, the network 100 may be connected through a plurality of high-speed communication links 160 using physical transport layers such as fiber, cable, twisted pair, air, or other media.

In one example embodiment of the IPTV video delivery system, the SHO 110 distributes content to one or more VHOs 120 which may be spread across a wide geographic territory, such as an entire country. The SHO 110 may, for example, be in a central location for acquisition and aggregation of national-level broadcast television (or linear) programming. A redundant SHO 110 may be provided for backup in case of failure. The SHO 110 may also provide the central point of on-demand content acquisition and insertion into the IPTV network. Linear programming may be received at the SHO 110 via satellite and processed for delivery to the VHO 120. Linear programming may also be converted and stored for use as VOD content. Additional VOD content may be received from various sources and processed/encoded to codec and bit rate requirements of the communication network for transmission to the VHO 120 over the high speed communication links. The VHOs 120 are the video distribution points within each DMA or geographic region.

Figure 2:
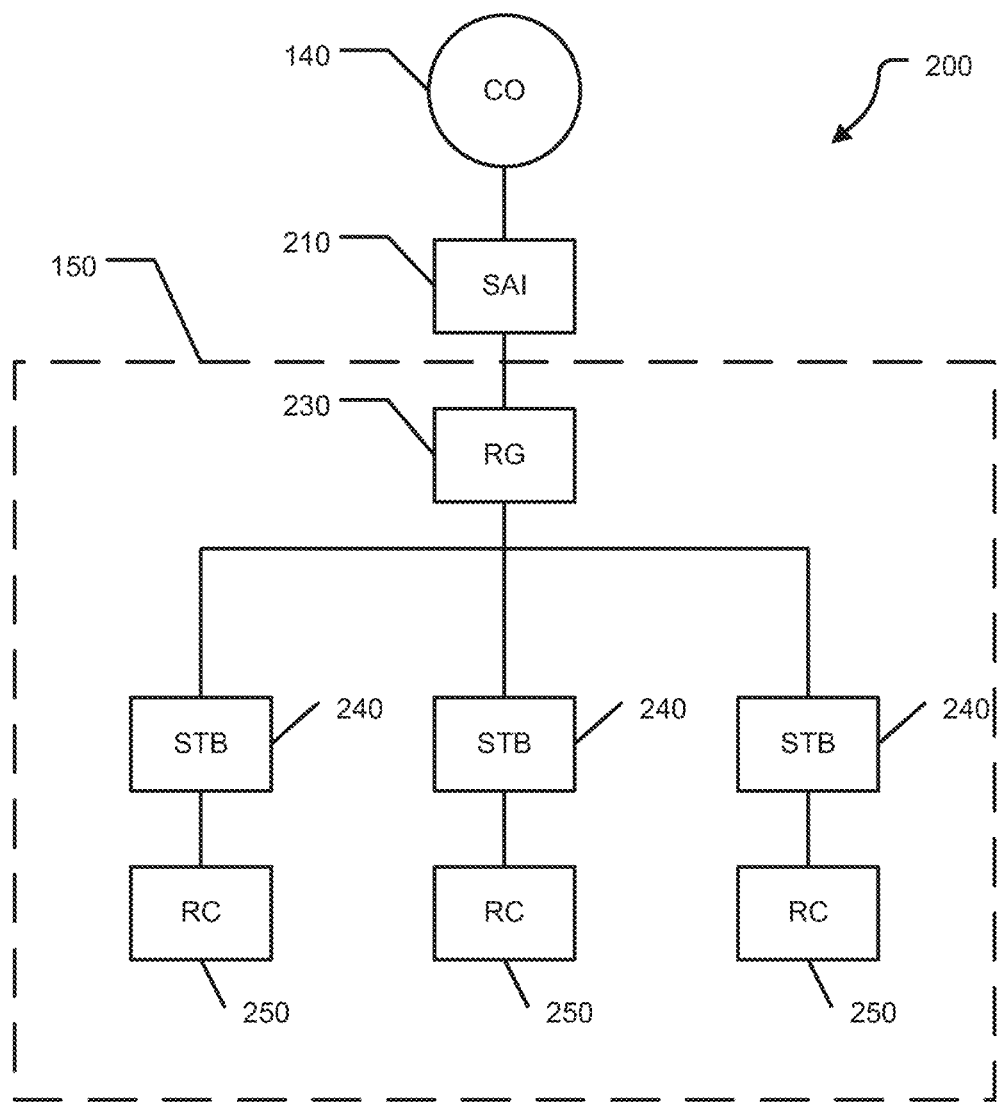

FIG. 2 shows an example network architecture 200 between the CO 140 and the viewer. A serving area interface (SAI) 210 may be connected to the CO 140. SAI 210 may, for example, be located in a weather-proof enclosure proximate to the viewer premises, and may include fiber-to-the-node (FTTN) equipment. FTTN equipment may also be located in the CO 140. CPE 150 includes, for example, a network interface device (NID) and a residential gateway (RG) 230, with a built-in very-high-bit rate digital subscriber loop (VDSL) modem or optical network termination (ONT). In either case, the RG 230 may be connected to the rest of the home set-top boxes (STBs) 240 via an internal network such as an Ethernet. Each STB 240 has an associated remote control (RC) 250 that provides data entry to the STB 240 to control the IPTV selections from the IPTV data streams.

Figure 3:
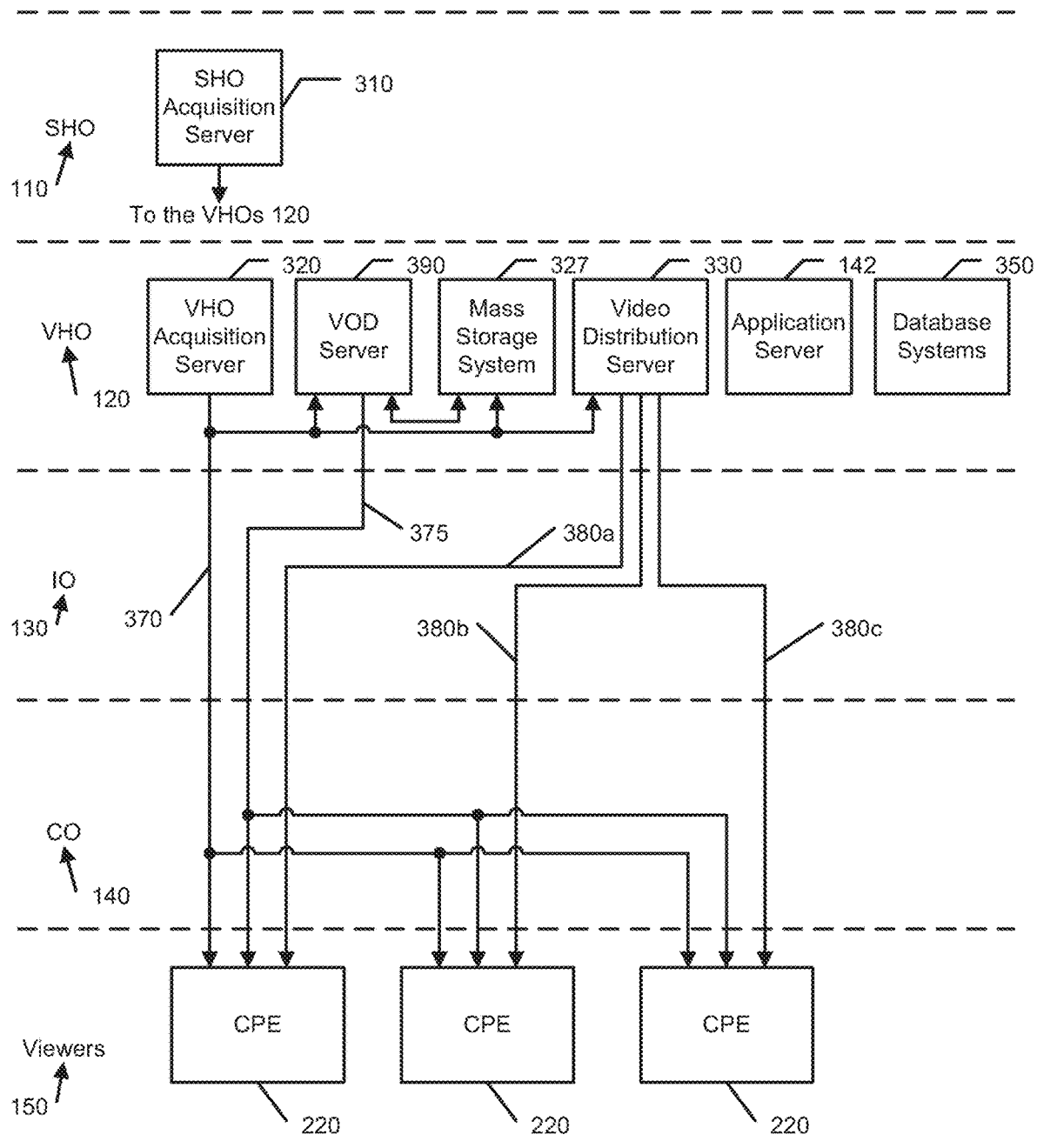

FIG. 3 shows one example embodiment of an SHO acquisition server 310 that may be used to acquire national content to be distributed towards the VHO 120. In an alternative embodiment, live television content may be acquired using an acquisition server 320 in the VHO 120. In this configuration, the VHO 120 may include the live television acquisition server 320 and a video distribution server 330, which forward the live television and/or other content toward the CPE 150 through the intermediate offices (IOs) 130 and the central office (CO) 140. A VHO 120 may also include application server 340 and regional viewer database systems 350. Traffic may reach the CPE 150 at least partially via either FTTN or fiber to the premises (FTTP), or by other types of transmission medium.

The acquisition server 320 may distribute a plurality of live television programs, each typically associated with a television "channel," using a multicast IP protocol data stream 370 through the IOs 130 and COs 140 to the CPE 150. The routers, switches, and other network elements that would normally be present in the IOs 130 and COs 140 are not shown in FIG. 3 in order to simplify the drawing. The number of programs or channels sent in the multicast stream may range up to seven hundred channels or more using present technology, with it being understood that advances in technology may allow many more channels to be sent. The multicast protocol allows for efficient distribution of these signals to a large number of CPE 150. In addition, the video distribution server 330 receives the multicast data stream 370, and distributes selected ones of the live television signals, extracted from the stream 370, using a unicast data stream 380*a*, 380*b*, or 380*c*, to specific CPE 150.

Also provided in the VHO 120, or alternatively at another distribution point in the IPTV network such as the SHO 110, IO 130, or CO 140, is a VOD server 390 that distributes content to CPE 150. VHO 120 may be connected to, in an example embodiment, one or more mass storage devices or systems 327, such as magnetic disk drives or optical recording systems. In addition, VOD server 390 includes software to support interaction with CPE 150 through STB 240. For example, viewers can interact with the VOD server 390 using the remote control 250 and an STB 240 to request delivery of the content to them from VOD server 390. The STB 240 may request content on VOD server 390 that is delivered, in one example embodiment, with multicast data stream 375. Alternatively, the content may be delivered with a unicast data stream from the VOD server 390 to the STB 240.

According to one embodiment, access to programming under the control of VOD server 390, or alternatively access to regularly scheduled programming on the television channels, may be controlled by an STB 240 in the viewer's premises. Thus, in one example embodiment, the VOD server 390 provides television programming upon demand by viewers as more fully described herein.

According to one example embodiment, referring to FIGS. 2 and 3, television shows may be monitored on the viewer side, for example in the STB 240. On the viewer side, the STB 240 can receive viewer-initiated control commands, such as channel changes, video-on-demand program ordering, and other control information from, for example the RC 250. This information can be used to collect accurate information of all the viewers' television viewing information by querying each individual viewer's STB 240. Alternatively, if such statistics are not available from the STB 240, viewing information can be obtained from the RG 230 based on IP multicast information obtained from the RG. In another embodiment, the viewing information may be obtained from the VHO 120 based on, for example, VOD requests sent from the STB 240 to the VOD server 390 in VHO 120. As a result, viewing information can be collected from the VOD server 390 and used to determine the overall viewing of a particular show, such as for billing or determining popularity of the content.

In an embodiment, VOD servers can be located throughout a communications network, such as the Internet or a cellular data network. The VOD servers can provide VOD content to devices within the communications network including cell phones, computers, or other devices capable of receiving and displaying VOD content. A device can receive the VOD content from a VOD server closest to the device within the network.

Figure 4:
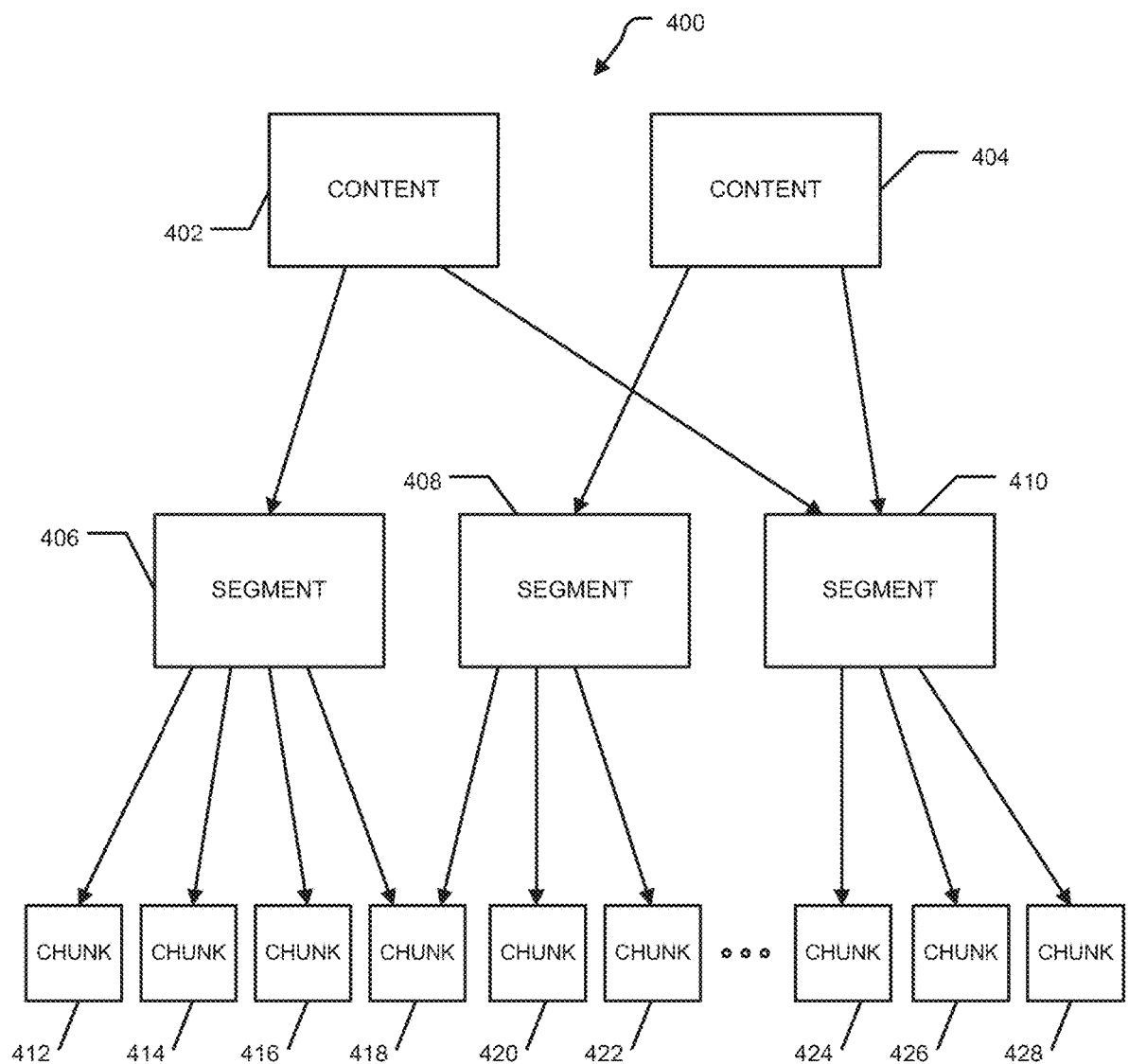
FIG. 4 is a block diagram illustrating an exemplary data model.

FIG. 4 shows an exemplary data model, generally designated 400. Content 402 and 404 such as video programming, data files, software, or other digital information, can consist of a sequence of segments 406-410. A segment 410 can be part of multiple content 402 and 404. For example, a segment including the opening or closing sequences for a television series can be included in multiple episodes. Segments 406-410 can be comprised of a sequence of chunks 412-428. The size of the chunks 412-428 may be chosen based on several considerations, including typical file size, amortization of overhead, and resilience to download failures from a serving node. Each chunk 412-428, segment 406-410, and content 402 and 404 can be assigned a globally unique identifier (GUID). Additionally, a chunk 418 may be incorporated into multiple segments 406 and 408 and have multiple GUIDs.

In an exemplary embodiment, a playfile can be provided for each content. The playfile can include the information about the segments and chunks that are part of the content. For example, the playfile may include a list of segment and chunk identifiers in an order required to reconstruct or playback the content. The chunk identifiers may include a hash of the entire chunk. Similarly, the segment identifiers may include a hash of the entire segment. The hash can be computed using the MD5 algorithm, the SHA-1 algorithm, or other cryptographically secure hash algorithms known in the art. Alternatively, the playfile may include a content record including segment identifiers and the order of the segments. The playfile may further include a segment record for each segment identified in the content record. Each segment record may include chunk identifiers and the order of the chunks within each segment. A receiver, such as STB 240, can use the playfile to determine which chunks are needed to reconstruct or playback the content. Further, the playfile can include hashes of a number of packets for each chunk. The packets can be blocks of data of a predefined size. In an exemplary embodiment, a server may generate a unique playfile for each receiver requesting content. The unique playfile may include security information, such as hashes for verification of packets or chunks within the content. The unique playfile may be distributed securely, such as via an encrypted connection, to the receiver.

Figure 5:
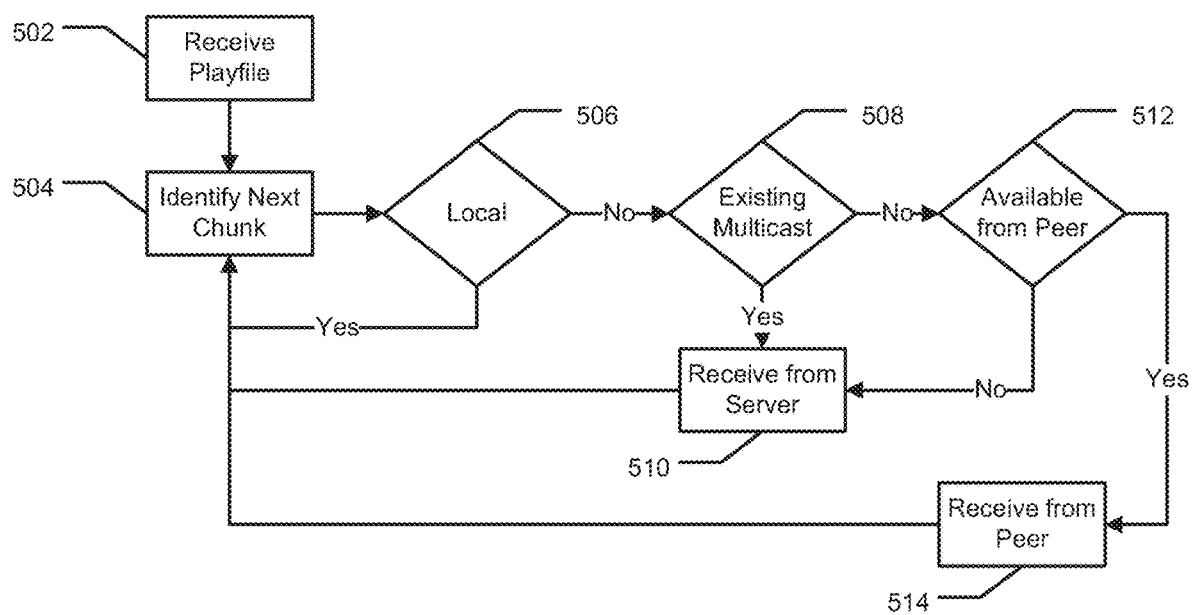
FIG. 5 is a flow diagram illustrating an exemplary method for peer-to-peer distribution of content.

FIG. 5 shows a flow diagram illustrating an exemplary embodiment of peer-to-peer distribution of content. At 502, a receiver, such as STB 240, can receive a playfile for the content. The playfile can identify the segments and chunks that comprise the content. Additionally, the playfile can indicate an order of the chunks required for reconstruction or playback of the content. In an embodiment, the playfile may be transmitted securely, such as over an encrypted connection. At 504, the receiver can request a chunk identified in the playfile for the content. At 506, the receiver can check the local cache for the chunk. When the chunk is available from the local cache, the receiver can retrieve the chunk from the local cache and may return to 504 to request an additional chunk.

At 508, when the chunk is unavailable from the local cache, the receiver can determine if the chunk is available from a server, such as through a multicast or unicast stream. The chunk may be immediately available, or the chunk may be scheduled for delivery at a later time. Additionally, the receiver can provide the server with a deadline for receiving the chunk. In an embodiment, the chunk can be available through a multicast stream and scheduled for delivery within the deadline requested by the receiver. When the chunk is available through a multicast stream, the receiver can join the multicast stream at 510 and receive the chunk and return to 504 to request an additional chunk. In an embodiment, the receiver can continue to receive subsequent chunks from the server.

When the chunk is not available from the server, the receiver can find a peer storing the chunk, as illustrated at 512. In an embodiment, the peers may be peers that are close in the network to the receiver. Additionally, peer servers may be located throughout the network to cache content close to the receivers. The receiver may send a request to a server to identify which peers are storing the chunk. Alternatively, the receiver may send a request to a set of peers to determine which peers are storing the chunk. The request may be a broadcast request to all peers, or it may be directed requests to known peers. Known peers may include peers that have previously requested or served content. When no peer currently storing the chunk is located, the receiver can receive the chunk from the server at 510 and return to 504 to request an additional chunk. At 512, when a peer storing the chunk is found, the receiver can receive the chunk from the peer, as illustrated at 514, and may return to 504 to request an additional chunk.

In an exemplary embodiment, requests for additional chunks may be streamlined. For example, if a peer is found to provide a first chunk, the receiver may retrieve additional available sequential chunks from the peer without searching for an alternative peer. Alternatively, if no peer is found with a first chunk or if the first chunk is provided through a multicast stream, the receiver may retrieve several sequential chunks from the server without searching for a peer with those sequential chunks.

In another exemplary embodiment, the receiver may receive chunks from more than one peer. For example, the receiver can receive a first chunk from a first peer while receiving a second chunk from a second peer. Utilizing multiple sources for the chunks can decrease the time required to receive multiple chunks when the available upload bandwidth of a peer is less than the available download bandwidth of the receiver.

Figure 6:
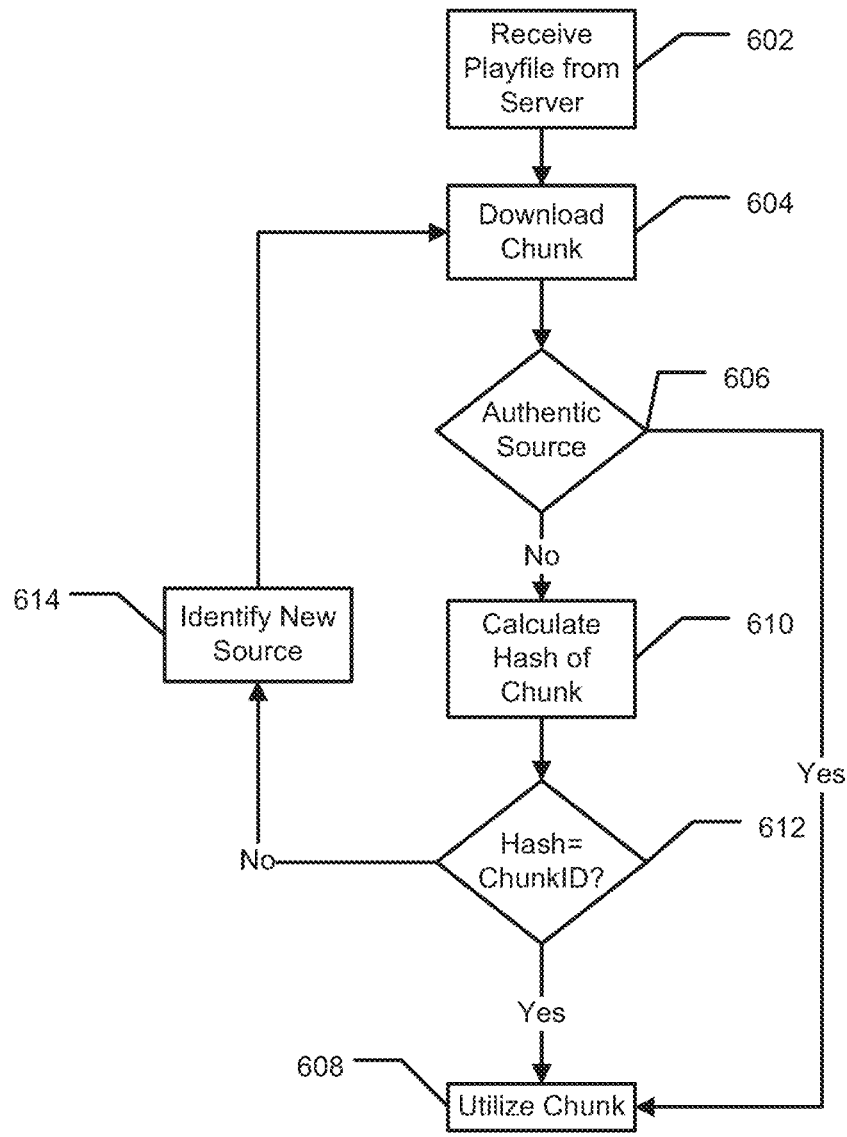
FIG. 6 is a flow diagram illustrating an exemplary method of verifying content received from a peer.

FIG. 6 shows a flow diagram illustrating an exemplary method for validating content. As illustrated at 602, a receiver, such as STB 240, can receive a playfile from a server, such as VOD server 390. The playfile can include an ordered list of chunks for the content. The content may be VOD content, a data file, a software update, or other digital information. Additionally, the playfile can include hashes of at least a portion of the chunks. In an embodiment, the hash of the chunk may be included in a chunk identifier. At 604, the receiver can receive a chunk. The chunk may be received from a trusted source, such as the VOD server, or a non-trusted source, such as a peer. When the content is received from a trusted source, the receiver may not need to validate the chunk. Alternatively, when the content is received from a non-trusted source, the receiver may validate the chunk based on the hash information included in the playfile.

At 606, when the chunk was received from a trusted source, the receiver can utilize the chunk, as illustrated at 608. Alternatively, when the chunk is not received from the trusted source, such as when the chunk is received from a peer, the receiver may calculate the hash of the chunk, as illustrated at 610. At 612, the receiver can compare the calculated hash of the chunk to the corresponding hash included in the playfile. When the calculated hash matches the corresponding hash included in the playfile, the receiver can utilize the chunk. For example, when the chunk is a part of VOD content, the chunk may be displayed. In another example, when the chunk is part of a data file, the chunk may be saved until the remaining chunks have been received. Alternatively, when the calculated hash does not match the corresponding hash included in the playfile, the chunk may be corrupted. For example, a network error may have occurred or the chunk may have been tampered with. At 614, the receiver can identify a new source for the chunk, and download the chunk from the new source at 604.

Figure 7:
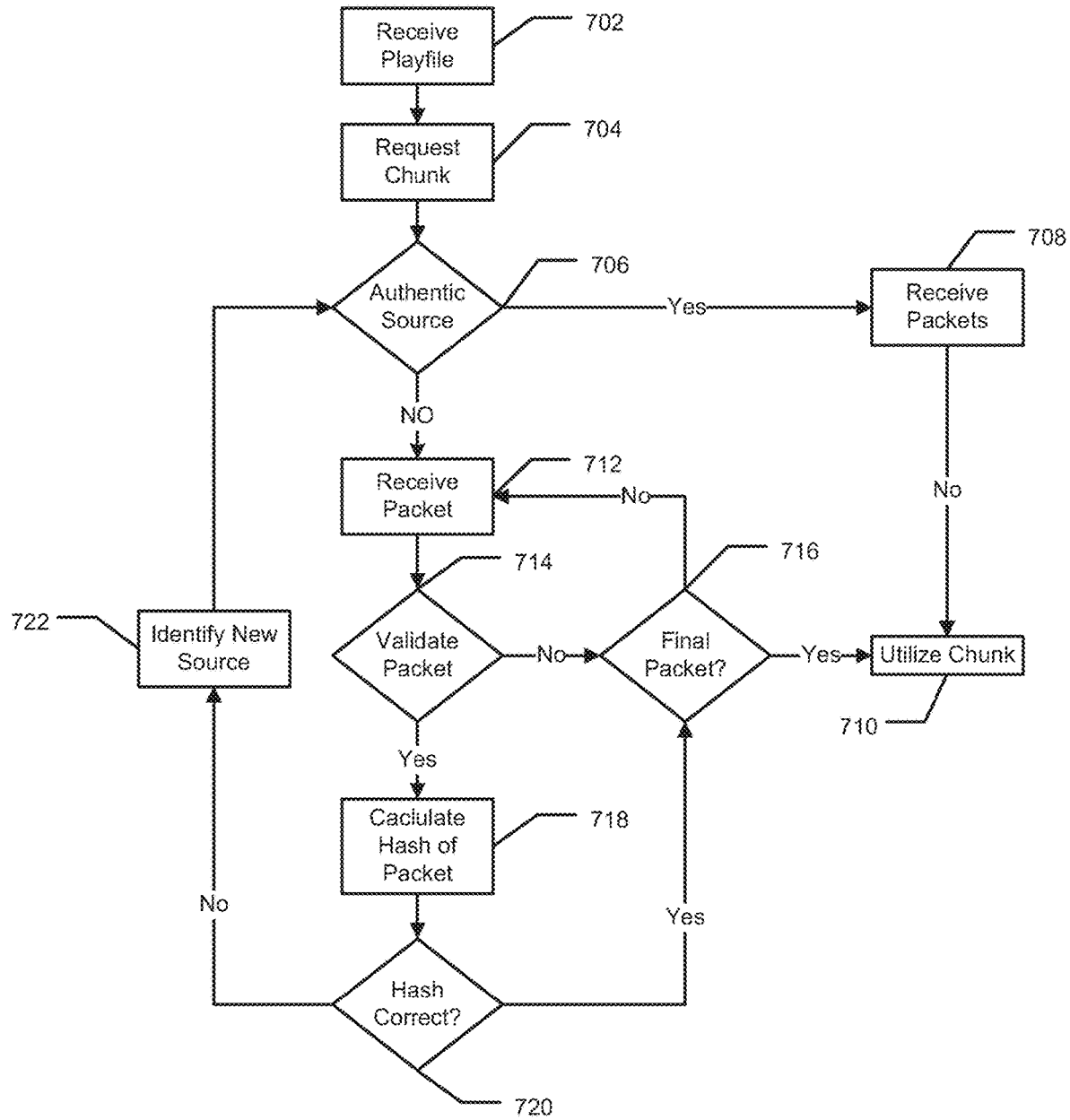
FIG. 7 is a flow diagram illustrating another exemplary method of verifying content received from a peer.

FIG. 7 shows a flow diagram illustrating another exemplary method for validating content. As illustrated at 702, a receiver, such as STB 240, can receive a playfile from a server, such as VOD server 390. The playfile can include an order list of chunks for the content. The content may be VOD content, a data file, a software update, or other digital information. Additionally, the playfile can include packet identifiers and hashes for at least a subset of the packets that make up the chunks. The packet identifiers can be the sequence number of the packet within the chunk. In an embodiment, the playfile can be unique to the client. For example, the subset of packets may be randomly selected to be unique to the client.

At 704, the receiver can request a chunk. The receiver may request the chunk from a trusted source, such as the server, or a non-trusted source, such as a peer. When the chunk is received from a trusted source, the receiver may not validate the content. Alternatively, when the chunk is received from a non-trusted source, the receiver may validate the content based on the hash information included in the playfile.

At 706, when the chunk is requested from a trusted source, the receiver can receive the packets of the chunk, as illustrated at 708. At 710, the receiver can utilize the chunk. For example, when the chunk is a part of VOD content, the chunk may be displayed. Further, when the content is a realtime audio/video stream, the packets may be played as received without waiting to receive the complete chunk. In another example, such when the chunk is part of a data file, the chunk may be saved until the remaining chunks have been received.

Alternatively, when the chuck is requested from a non-trusted source, such as a peer, the receiver can receive a packet of the chunk, as illustrated at 712. At 714, the receiver can determine if the packet requires validation. The packet can require validation when the playfile includes a packet identifier and hash corresponding to the packet. When the packet does not require validation, the receiver can determine if the packet is the final packet of the chunk, as illustrated at 716. When the packet is the final packet of the chunk, the receiver can utilize the chunk, as illustrated at 710. In an embodiment, when the content is a realtime audio/video stream, the packets may be played as received without waiting to receive the complete chunk. Alternatively, when the packet is not the final packet, the receiver can receive another packet of the chunk, as illustrated at 712.

Returning to 714, when the packet requires validation, the receiver can calculate a hash of the packet, as illustrated at 718. At 720, the receiver can compare the calculated hash to the corresponding hash included in the playfile. When the calculated hash matches the corresponding hash, the packet is valid and the receiver can determine if the packet is the final packet of the chunk, as illustrated at 716.

Alternatively, when the calculated hash does not match the corresponding hash, the chunk may be corrupted. For example, a network error may have occurred or the peer may have altered the chunk. At 722, the receiver can identify a new source for the chunk, and request the chunk from the new source at 704. In an embodiment, the receiver may track the number of corrupted packets and discard the chunk only after the number of corrupted packets exceeds a threshold or a percentage of the total packets. Additionally, the receiver may report the identity of the peer and the number of corrupted packets to a server, such as a directory server. The directory server may use a peer score to determine the quality of the peer. The peer score can incorporate information such as the number of corrupt packets received from the peer, the number of clients reporting they have received corrupt packets from the peer, the ratio of corrupt packets to good packets received from the peer, or the like. When the peer score exceeds a threshold, the peer may be determined to be of poor quality and may be blacklisted. A poor quality or blacklisted peer may no longer be used to provide content.

Figure 8:
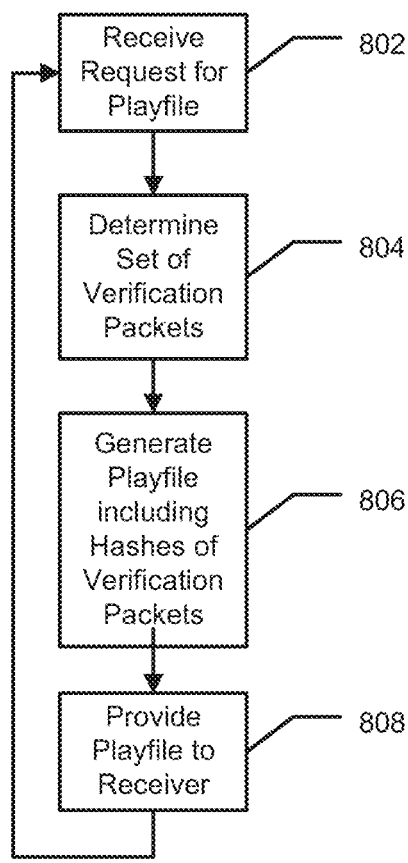
FIG. 8 is a flow diagram illustrating an exemplary method providing information to verify content received from a peer.

FIG. 8 shows a flow diagram illustrating an exemplary method for providing the playfile. At 802 a server, such as VOD server 390, can receive a request for a playfile from a receiver. The request for the playfile can include information identifying the content, such as a content identifier. At 804, the server can determine a set of verification packets. The set of verification packets can be a subset of the packets required for the content. Additionally, the set of verification packets can be unique to the receiver. In an embodiment, the verification packets for a chunk can be randomly selected and distributed substantially equally throughout the content. For example, a similar number of verification packets can be selected for each chunk. Additionally, packet selection may be unrestricted or limited to packets containing certain information, such as only packets including at least a portion of an MPEG I-frame.

In an embodiment, the number of verification packets per chunk can depend on a verification policy. The verification policy may mandate that certain types of high-priority content require more verification packets. High priority content may include pay-per-view content, news programs, software updates, and the like. Additionally, the verification policy may require a greater number of verification packets for specific types of viewers or types of receivers. Further, the resolution of the content or playback device, video bitrates, perceived number of malicious peers, and the rate of network errors may influence the number of verification packets per chunk.

At 806, the server can generate a playfile specific to the receiver. The playfile can include the sequence of chunks required for the content and the identity and hash of each verification packet. At 808, the server can provide the playfile to the receiver.

In an embodiment, the server may calculate the hash for each packet of the content when the content is initially received from the content provider. The hash for each packet may be stored along with metadata of the content. In this way, the server only needs to calculate the hash of each packet once, and can retrieve the hash relatively quickly when the playfile is requested.

Figure 9:
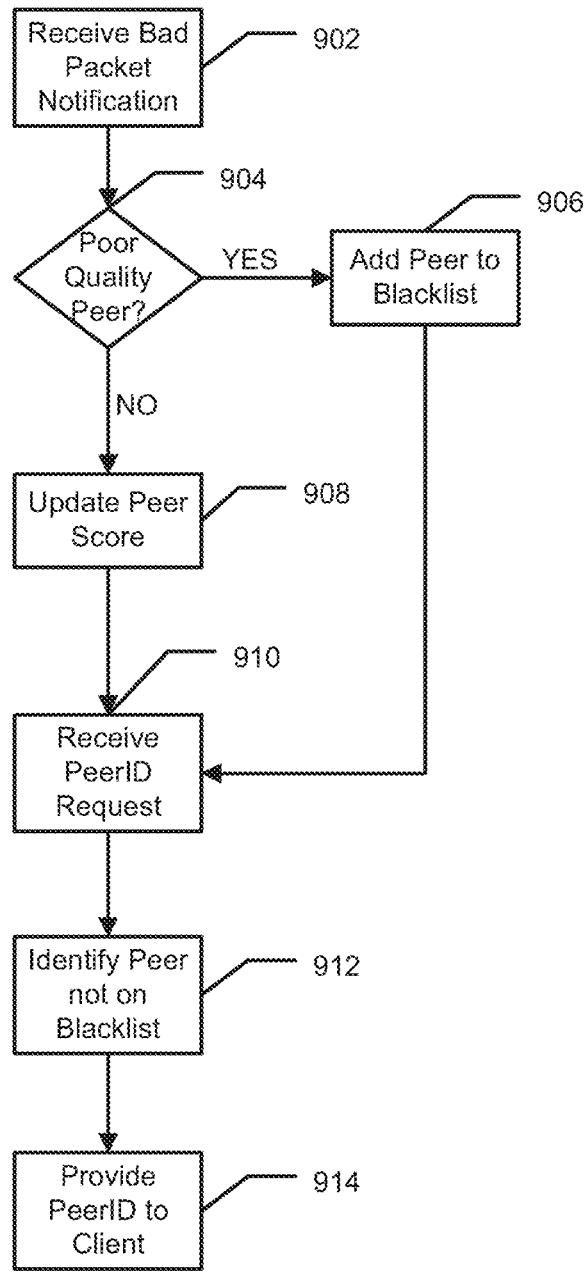
FIG. 9 is a flow diagram illustrating an exemplary method of tracking peers providing invalid content.

FIG. 9 shows a flow diagram illustrating an exemplary method for tracking peers providing invalid packets. At 902, a server, such as a directory server, can receive a bad packet notification from a client. The bad packet notification can identify a peer from which the client received a corrupt or invalid packet. The hash calculated for the corrupt or invalid packet may not match the corresponding hash included in the playfile. At 904, the server can determine if the peer is a poor quality peer. The poor quality peer may be a peer that intentionally provides corrupt packets or may be a peer with a poor quality network connection that results in a higher that expected network error rate. The server may determine the peer is a poor quality peer based on a peer score. The peer score can represent a number of bad packet received, a number of clients reporting bad packets, or any combination thereof. A poor quality peer can have a peer score that exceeds a threshold. In an embodiment, the threshold can depend on the expected error rate of the network to avoid classifying an excessive number of peers as poor quality peers due to network errors. At 906, when the server determines the peer is a poor quality peer, the server can add the peer to a blacklist. Alternatively, when the server does not determine that the peer is a poor quality peer, the server can update the peer score, as illustrated at 908.

At 910, the server can receive a request for a peer identifier from a client. The client may request the peer identifier in order to identify a quality peer that has a packet needed by the client. At 912, the server can identify a peer that has the packet and is not on the blacklist. For example, the peer can have a peer score that is below the threshold. At 914, the server can provide the peer identifier to the client.

Figure 10:
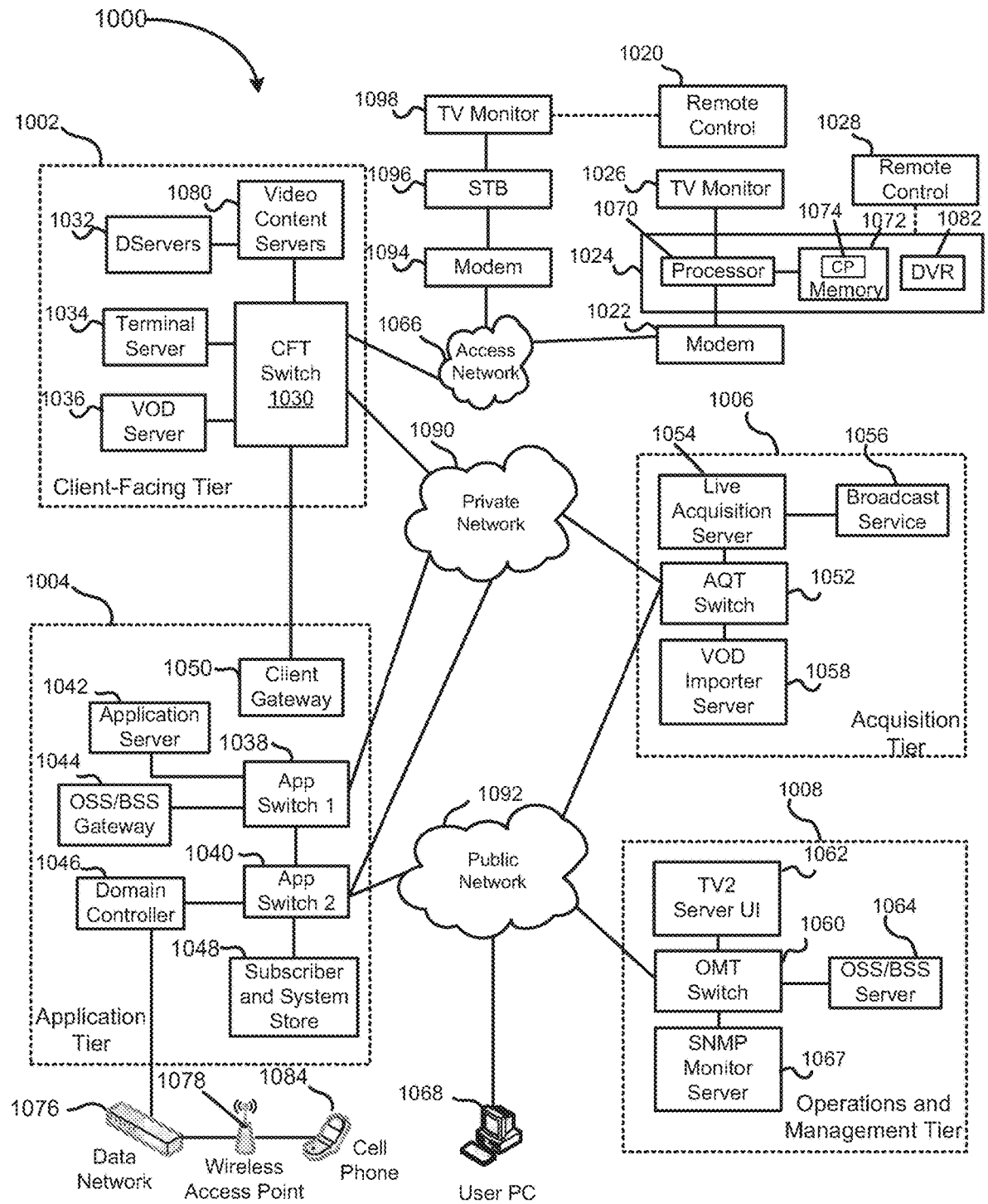
FIG. 10 is a block diagram illustrating an IPTV network in accordance with one embodiment of the present disclosure.

FIG. 10 shows an IPTV system 1000 that can be used in conjunction with television distribution system or network 100. IPTV system 1000 can include a client facing tier 1002, an application tier 1004, an acquisition tier 1006, and an operations and management tier 1008. Each tier 1002, 1004, 1006, and 1008 is coupled to one or both of a private network 1010 and a public network 1012. For example, the client-facing tier 1002 can be coupled to the private network 1010, while the application tier 1004 can be coupled to the private network 1010 and to the public network 1012 such as the Internet. The acquisition tier 1006 can also be coupled to the private network 1010 and to the public network 1012. Moreover, the operations and management tier 1008 can be coupled to the public network 1012.

The various tiers 1002, 1004, 1006, and 1008 communicate with each other via the private network 1010 and the public network 1012. For instance, the client-facing tier 1002 can communicate with the application tier 1004 and the acquisition tier 1006 via the private network 1010. The application tier 1004 can also communicate with the acquisition tier 1006 via the private network 1010. Further, the application tier 1004 can communicate with the acquisition tier 1006 and the operations and management tier 1008 via the public network 1012. Moreover, the acquisition tier 1006 can communicate with the operations and management tier 1008 via the public network 1012. In a particular embodiment, elements of the application tier 1004 can communicate directly with the client-facing tier 1002.

The client-facing tier 1002 can communicate with user equipment via a private access network 1066, such as an IPTV network. In an illustrative embodiment, modems such as a first modem 1014 and a second modem 1022 can be coupled to the private access network 1066. The client-facing tier 1002 can communicate with a first representative set-top box (STB) device 1016 via the first modem 1014 and with a second representative set-top box device 1024 via the second modem 1022. The client-facing tier 1002 can communicate with a large number of set-top boxes over a wide geographic area, such as a regional area, a metropolitan area, a viewing area, or any other suitable geographic area that can be supported by networking the client-facing tier 1002 to numerous set-top box devices. In one embodiment, the client-facing tier 1002 can be coupled to the modems 1014 and 1022 via fiber optic cables. Alternatively, the modems 1014 and 1022 can be digital subscriber line (DSL) modems that are coupled to one or more network nodes via twisted pairs, and the client-facing tier 1002 can be coupled to the network nodes via fiber-optic cables. Each set-top box device 1016 and 1024 can process data received from the private access network 1066 via an IPTV software platform such as Microsoft® TV IPTV Edition.

The first set-top box device 1016 can be coupled to a first display device 1018, such as a first television monitor, and the second set-top box device 1024 can be coupled to a second display device 1026, such as a second television monitor. Moreover, the first set-top box device 1016 can communicate with a first remote control 1020, and the second set-top box device can communicate with a second remote control 1028. In an exemplary, non-limiting embodiment, each set-top box device 1016 and 1024 can receive data or video from the client-facing tier 1002 via the private access network 1066 and render or display the data or video at the display device 1018 or 1026 to which it is coupled. The set-top box devices 1016 and 1024 thus may include tuners that receive and decode television programming information for transmission to the display devices 1018 and 1026. Further, the set-top box devices 1016 and 1024 can include an STB processor 1070 and an STB memory device 1072 that is accessible to the STB processor. In a particular embodiment, the set-top box devices 1016 and 1024 can also communicate commands received from the remote controls 1020 and 1028 back to the client-facing tier 1002 via the private access network 1066.

In an illustrative embodiment, the client-facing tier 1002 can include a client-facing tier (CFT) switch 1030 that manages communication between the client-facing tier 1002 and the private access network 1066 and between the client-facing tier 1002 and the private network 1010. As shown, the CFT switch 1030 is coupled to one or more data servers 1032 that store data transmitted in response to user requests, such as video-on-demand material. The CFT switch 1030 can also be coupled to a terminal server 1034 that provides terminal devices, such as a game application server and other devices with a common connection point to the private network 1010. In a particular embodiment, the CFT switch 1030 can also be coupled to a VOD server 1036.

The application tier 1004 can communicate with both the private network 1010 and the public network 1012. In this embodiment, the application tier 1004 can include a first application tier (APP) switch 1038 and a second APP switch 1040. In a particular embodiment, the first APP switch 1038 can be coupled to the second APP switch 1040. The first APP switch 1038 can be coupled to an application server 1042 and to an OSS/BSS gateway 1044. The application server 1042 provides applications to the set-top box devices 1016 and 1024 via the private access network 1066, so the set-top box devices 1016 and 1024 can provide functions such as display, messaging, processing of IPTV data and VOD material. In a particular embodiment, the OSS/BSS gateway 1044 includes operation systems and support (OSS) data, as well as billing systems and support (BSS) data.

The second APP switch 1040 can be coupled to a domain controller 1046 that provides web access, for example, to users via the public network 1012. The second APP switch 1040 can be coupled to a subscriber and system store 1048 that includes account information, such as account information that is associated with users who access the system 1000 via the private network 1010 or the public network 1012. In a particular embodiment, the application tier 1004 can also include a client gateway 1050 that communicates data directly to the client-facing tier 1002. In this embodiment, the client gateway 1050 can be coupled directly to the CFT switch 1030. The client gateway 1050 can provide user access to the private network 1010 and the tiers coupled thereto.

For example, when the set-top box device 1016 accesses the system 1000 via the private access network 1066, the client gateway 1050 can verify viewer information by communicating with the subscriber and system store 1048 via the private network 1010, the first APP switch 1038 and the second APP switch 1040. Further, the client gateway 1050 can verify billing information and status by communicating with the OSS/BSS gateway 1044 via the private network 1010 and the first APP switch 1038. The OSS/BSS gateway 1044 can transmit a query across the first APP switch 1038, to the second APP switch 1040, and the second APP switch 1040 can communicate the query across the public network 1012 to the OSS/BSS server 1064. After the client gateway 1050 confirms viewer and/or billing information, the client gateway 1050 can allow the set-top box device 1016 access to IPTV content and VOD content. If the client gateway 1050 cannot verify viewer information for the set-top box device 1016, such as because it is connected to a different twisted pair, the client gateway 1050 can deny transmissions to and from the set-top box device 1016 beyond the private access network 1066.

The acquisition tier 1006 includes an acquisition tier (AQT) switch 1052 that communicates with the private network 1010. The AQT switch 1052 can also communicate with the operations and management tier 1008 via the public network 1012. In a particular embodiment, the AQT switch 1052 can be coupled to a live acquisition server 1054 that receives television content, for example, from a broadcast service 1056. Further, the AQT switch can be coupled to a VOD importer server 1058 that stores television content received at the acquisition tier 1006 and communicate the stored content to the client-facing tier 1002, such as to VOD server 1036, via the private network 1010.

The operations and management tier 1008 can include an operations and management tier (OMT) switch 1060 that conducts communication between the operations and management tier 1008 and the public network 1012. In the illustrated embodiment, the OMT switch 1060 is coupled to a TV2 server 1062. Additionally, the OMT switch 1060 can be coupled to an OSS/BSS server 1064 and to a simple network management protocol (SNMP) monitor 1067 that monitors network devices. In a particular embodiment, the OMT switch 1060 can communicate with the AQT switch 1052 via the public network 1012.

In a particular embodiment during operation of the IPTV system, the live acquisition server 1054 can acquire television content from the broadcast service 1056. The live acquisition server 1054 in turn can transmit the television content to the AQT switch 1052 and the AQT switch can transmit the television content to the CFT switch 1030 via the private network 1010. Further, the television content can be encoded at the D-servers 1032, and the CFT switch 1030 can communicate the television content to the modems 1014 and 1022 via the private access network 1066. Additionally, the VOD server 1036 may capture and store the television content for later use, such as video-on-demand. The set-top box devices 1016 and 1024 can receive the television content from the modems 1014 and 1022, decode the television content, and transmit the content to the display devices 1018 and 1026 according to commands from the remote control devices 1020 and 1028.

Additionally, at the acquisition tier 1006, the VOD importer server 1058 can receive content from one or more VOD sources outside the IPTV system 1000, such as movie studios and programmers of non-live content. The VOD importer server 1058 can transmit the VOD content to the AQT switch 1052, and the AQT switch 1052 in turn can communicate the material to the CFT switch 1030 via the private network 1010. The VOD content can be stored at one or more servers, such as the VOD server 1036.

When a user issues a request for VOD content to the set-top box device 1016 or 1024, the request can be transmitted over the private access network 1066 to the VOD server 1036 via the CFT switch 1030. Upon receiving such a request, the VOD server 1036 can retrieve requested VOD content and transmit the content to the set-top box device 1016 or 1024 across the private access network 1066 via the CFT switch 1030.

The domain controller 1046 communicates with the public network 1012 via the second APP switch 1040. Additionally, the domain controller 1046 can communicate via the public network 1012 with the PC 1068. For example, the domain controller 1046 can display a web portal via the public network 1012 and allow users to access the web portal using the PC 1068. Further, in an illustrative embodiment, the domain controller 1046 can communicate with at least one wireless network access point 1078 over a data network 1076. In this embodiment, each wireless network access device 1078 can communicate with user wireless devices such as a cellular telephone 1084.

In a particular embodiment, the set-top box devices can include an STB computer program 1074 that is embedded within the STB memory device 1072. The STB computer program 1074 can contain instructions to receive and execute at least one user television viewing preference that a user has entered by accessing an Internet user account via the domain controller 1046. For example, the user can use the PC 1068 to access a web portal maintained by the domain controller 1046 via the Internet. The domain controller 1046 can query the subscriber and system store 1048 via the private network 1010 for account information associated with the user. In a particular embodiment, the account information can associate the user's Internet account with the second set-top box device 1024. For instance, in an illustrative embodiment, the account information can relate the user's account to the second set-top box device 1024 by associating the user account with an IP address of the second set-top box device, with data relating to one or more twisted pairs connected with the second set-top box device, with a data related to one or more fiber optic cables connected with the second set-top box device, with an alphanumeric identifier of the second set-top box device, with any other data that is suitable for associating the second set-top box device with a user account, or with any combination of these.

The STB computer program 1074 can contain instructions to receive many types of user preferences from the domain controller 1046 via the access network 1066. For example, the STB computer program 1074 can include instructions to receive a request to record at least one television program at a video content storage module such as a digital video recorder (DVR) 1082 within the second set-top box device 1024. In this example embodiment, the STB computer program 1074 can include instructions to transmit the request to the DVR 1082, where the television program(s) are recorded. In an illustrative embodiment, the STB computer program 1074 can include instructions to receive from the DVR 1082 a recording status with respect to one or more of the television programs and to transmit at least one message regarding the status to a wireless device, such as the cellular telephone 1084. The message can be received at the CFT switch 1030, for instance, and communicated to the domain controller 1046 across the private network 1010 via the second APP switch 1040. Further, the domain controller 1046 can transmit the message to the wireless data network 1076, directly or via the public network 1012, and on to the wireless network access point 1078. The message can then be transmitted to the cellular telephone 1084. In an illustrative embodiment, the status can be sent via a wireless access protocol (WAP).

Figure 11:
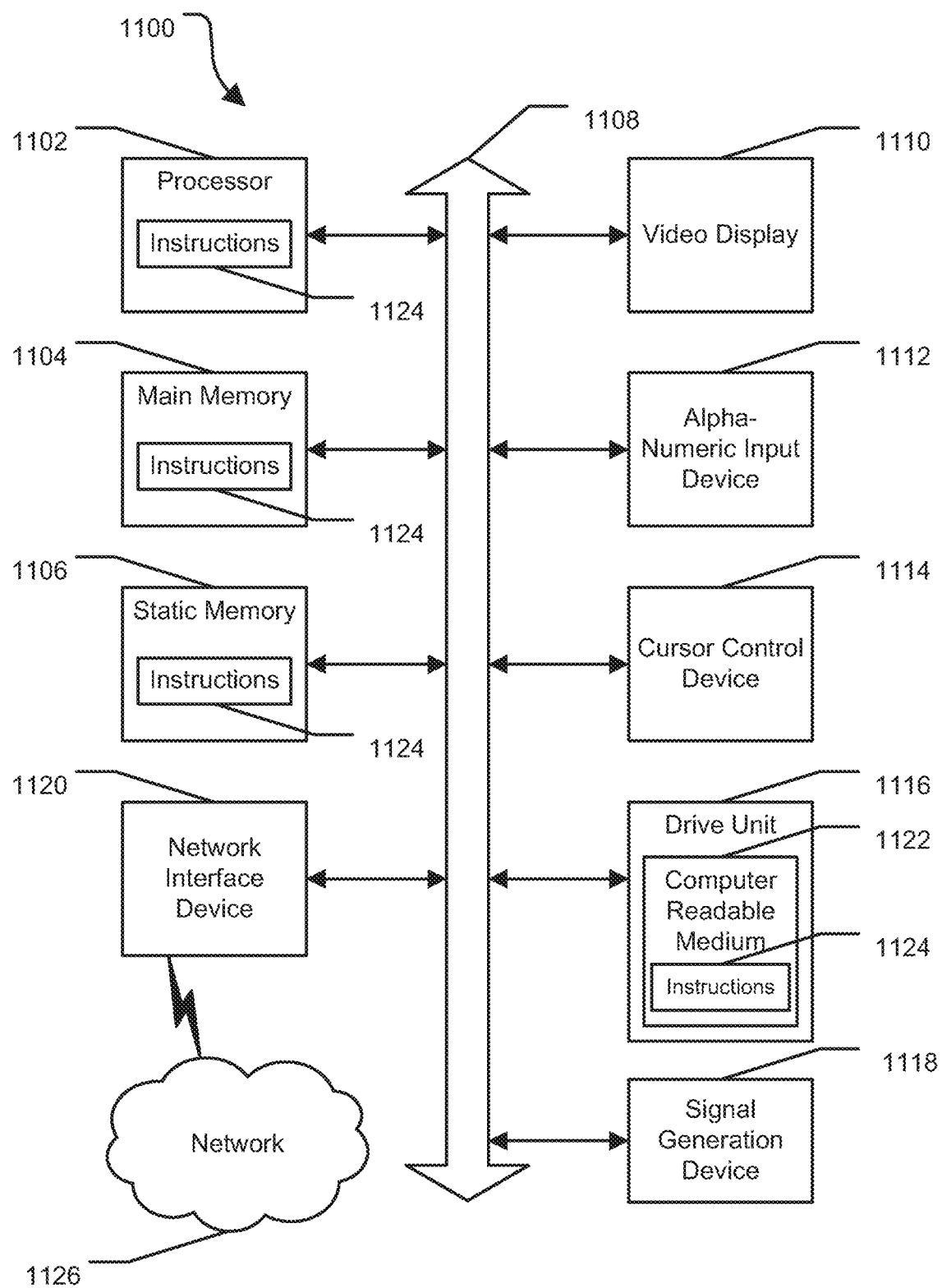
FIG. 11 is an illustrative embodiment of a general computer system.

FIG. 11 shows an illustrative embodiment of a general computer system 1100. The computer system 1100 can include a set of instructions that can be executed to cause the computer system to perform any one or more of the methods or computer based functions disclosed herein. The computer system 1100 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

The computer system 1100 may include a processor 1102, such as a central processing unit (CPU), a graphics processing unit (GPU), or both. Moreover, the computer system 1100 can include a main memory 1104 and a static memory 1106 that can communicate with each other via a bus 1108. As shown, the computer system 1100 may further include a video display unit 1110 such as a liquid crystal display (LCD), an organic light emitting diode (OLED), a flat panel display, a solid-state display, or a cathode ray tube (CRT). Additionally, the computer system 1100 may include an input device 1112 such as a keyboard, and a cursor control device 1114 such as a mouse. Alternatively, input device 1112 and cursor control device 1114 can be combined in a touchpad or touch sensitive screen. The computer system 1100 can also include a disk drive unit 1116, a signal generation device 1118 such as a speaker or remote control, and a network interface device 1120 to communicate with a network 1126. In a particular embodiment, the disk drive unit 1116 may include a computer-readable medium 1122 in which one or more sets of instructions 1124, such as software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

FIG. 8 shows a flow diagram illustrating an exemplary method for providing the playfile. At 802 a server, such as VOD server 390, can receive a request for a playfile from a receiver. The request for the playfile can include information identifying the content, such as a content identifier. At 804, the server can determine a set of verification packets. The set of verification packets can be a subset of the packets required for the content. Additionally, the set of verification packets can be unique to the receiver. In an embodiment, the verification packets for a chunk can be randomly selected and distributed substantially equally throughout the content. For example, a similar number of verification packets can be selected for each chunk. Additionally, packet selection may be unrestricted or limited to packets containing certain information, such as only packets including at least a portion of an MPEG I-frame.

In an embodiment, the number of verification packets per chunk can depend on a verification policy. The verification policy may mandate that certain types of high-priority content require more verification packets. High priority content may include pay-per-view content, news programs, software updates, and the like. Additionally, the verification policy may require a greater number of verification packets for specific types of viewers or types of receivers. Further, the resolution of the content or playback device, video bitrates, perceived number of malicious peers, and the rate of network errors may influence the number of verification packets per chunk.

At 806, the server can generate a playfile specific to the receiver. The playfile can include the sequence of chunks required for the content and the identity and hash of each verification packet. At 808, the server can provide the playfile to the receiver.

In an embodiment, the server may calculate the hash for each packet of the content when the content is initially received from the content provider. The hash for each packet may be stored along with metadata of the content. In this way, the server only needs to calculate the hash of each packet once, and can retrieve the hash relatively quickly when the playfile is requested.

FIG. 9 shows a flow diagram illustrating an exemplary method for tracking peers providing invalid packets. At 902, a server, such as a directory server, can receive a bad packet notification from a client. The bad packet notification can identify a peer from which the client received a corrupt or invalid packet. The hash calculated for the corrupt or invalid packet may not match the corresponding hash included in the playfile. At 904, the server can determine if the peer is a poor quality peer. The poor quality peer may be a peer that intentionally provides corrupt packets or may be a peer with a poor quality network connection that results in a higher that expected network error rate. The server may determine the peer is a poor quality peer based on a peer score. The peer score can represent a number of bad packet received, a number of clients reporting bad packets, or any combination thereof. A poor quality peer can have a peer score that exceeds a threshold. In an embodiment, the threshold can depend on the expected error rate of the network to avoid classifying an excessive number of peers as poor quality peers due to network errors. At 906, when the server determines the peer is a poor quality peer, the server can add the peer to a blacklist. Alternatively, when the server does not determine that the peer is a poor quality peer, the server can update the peer score, as illustrated at 908.

At 910, the server can receive a request for a peer identifier from a client. The client may request the peer identifier in order to identify a quality peer that has a packet needed by the client. At 912, the server can identify a peer that has the packet and is not on the blacklist. For example, the peer can have a peer score that is below the threshold. At 914, the server can provide the peer identifier to the client.

What is claimed is:

1. A system, comprising:
    a memory that stores instructions; and
    a processor that executes the instructions to perform operations, the operations comprising:
        receiving a notification from a client system, wherein the notification indicates that the client system received a corrupt packet from a first peer;
        updating a first peer score for the first peer if the first peer is not a poor quality peer, wherein the first peer score incorporates a ratio of corrupt packets to good packets received from the first peer; and
        providing, to the client system, a peer identification associated with a second peer that is not on a black list so as to enable the client system to obtain an uncorrupted packet corresponding to the corrupt packet.

2. The system of claim 1, wherein the operations further comprise determining if the first peer is the poor quality peer.

3. The system of claim 1, wherein the operations further comprise determining if the second peer is not on the black list.

4. The system of claim 1, wherein the operations further comprise determining that the first peer is the poor quality peer when the first peer score exceeds a threshold.

5. The system of claim 1, wherein the operations further comprise determining whether the first peer intentionally provided the corrupt packet to the client system.

6. The system of claim 1, wherein the operations further comprise adding the first peer to the black list if the first peer is the poor quality peer.

7. The system of claim 1, wherein the operations further comprise receiving a request for a peer identifier from the client system.

8. The system of claim 7, wherein the operations further comprise determining a quality peer for the client system in response to receiving the request for the peer identifier.

9. The system of claim 1, wherein the operations further comprise determining that the second peer has a packet needed by the client system.

10. The system of claim 1, wherein the operations further comprise determining that the second peer has a second peer score that is lower than a threshold.

11. The system of claim 1, wherein the operations further comprise determining the first peer score based on a number of client systems receiving bad packets from the first peer.

12. A method, comprising:
receiving a notification from a client system, wherein the notification indicates that the client system received a corrupt packet from a first peer;
generating a first peer score for the first peer, wherein the first peer score incorporates a ratio of corrupt packets to good packets received from the first peer;
adding, by utilizing instructions from a memory that are executed by a processor, the first peer to a black list if the first peer is a poor quality peer; and
providing, to the client system, a peer identification associated with a second peer that is not on the black list so as to enable the client system to obtain an uncorrupted packet corresponding to the corrupt packet.

13. The method of claim 12, further comprising updating the first peer score for the first peer if the first peer is not the poor quality peer.

14. The method of claim 12, further comprising determining if the first peer is the poor quality peer.

15. The method of claim 12, further comprising determining whether the first peer intentionally provided the corrupt packet to the client system.

16. The method of claim 12, further comprising receiving a request for a peer identifier from the client system.

17. The method of claim 16, further comprising determining a quality peer for the client system in response to receiving the request for the peer identifier.

18. The method of claim 12, further comprising determining that the second peer has a packet needed by the client system.

19. The method of claim 12, further comprising determining a first peer score for the first peer based on a number of client systems receiving bad packets from the first peer.

20. A computer readable device comprising instructions, which, when loaded and executed by a processor, cause the processor to perform operations, the operations comprising:
receiving a notification from a client system, wherein the notification indicates that the client system received a corrupt packet from a first peer;
determining if the first peer is a poor quality peer;
updating a first peer score for the first peer if the first peer is not the poor quality peer, wherein the first peer score incorporates a ratio of corrupt packets to good packets received from the first peer; and
providing, to the client system, a peer identification associated with a second peer that is not on a black list so as to enable the client system to obtain an uncorrupted packet corresponding to the corrupt packet.

* * * * *